(No Model.) 2 Sheets—Sheet 1.

J. W. MARTIN.
BEE HIVE.

No. 318,638. Patented May 26, 1885.

WITNESSES:
Chas. Nida
C. Sedgwick

INVENTOR:
J. W. Martin
BY Munn & Co.
ATTORNEYS.

N. PETERS, Photo-Lithographer, Washington, D. C.

(No Model.) 2 Sheets—Sheet 2.
J. W. MARTIN.
BEE HIVE.
No. 318,638. Patented May 26, 1885.
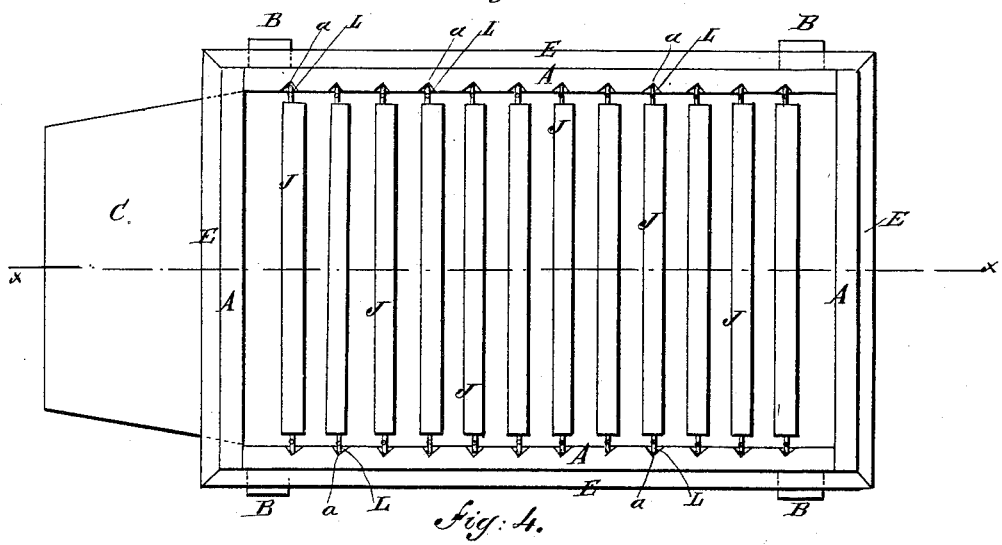
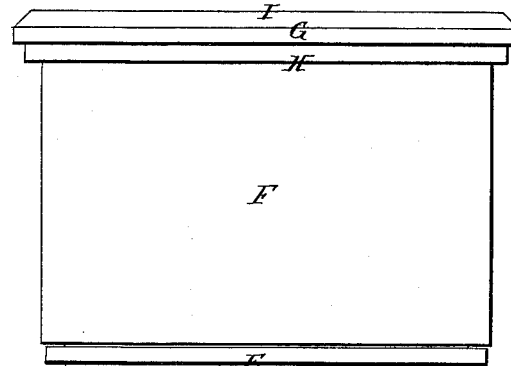
WITNESSES:
INVENTOR:
J. W. Martin
BY Munn & Co.
ATTORNEYS.

UNITED STATES PATENT OFFICE.

JOHN WILLIAM MARTIN, OF WINCHESTER, KENTUCKY, ASSIGNOR TO HIMSELF AND FREEMAN TUTT MARTIN, OF SAME PLACE.

BEE-HIVE.

SPECIFICATION forming part of Letters Patent No. 318,638, dated May 26, 1885.

Application filed December 24, 1884. (No model.)

*To all whom it may concern:*

Be it known that I, JOHN WILLIAM MARTIN, of Winchester, in the county of Clark and State of Kentucky, have invented new and useful Improvements in Bee-Hives, of which the following is a full, clear, and exact description.

Reference is to be had to the accompanying drawings, forming part of this specification, in which similar letters of reference indicate corresponding parts in all the figures.

Figure 1:
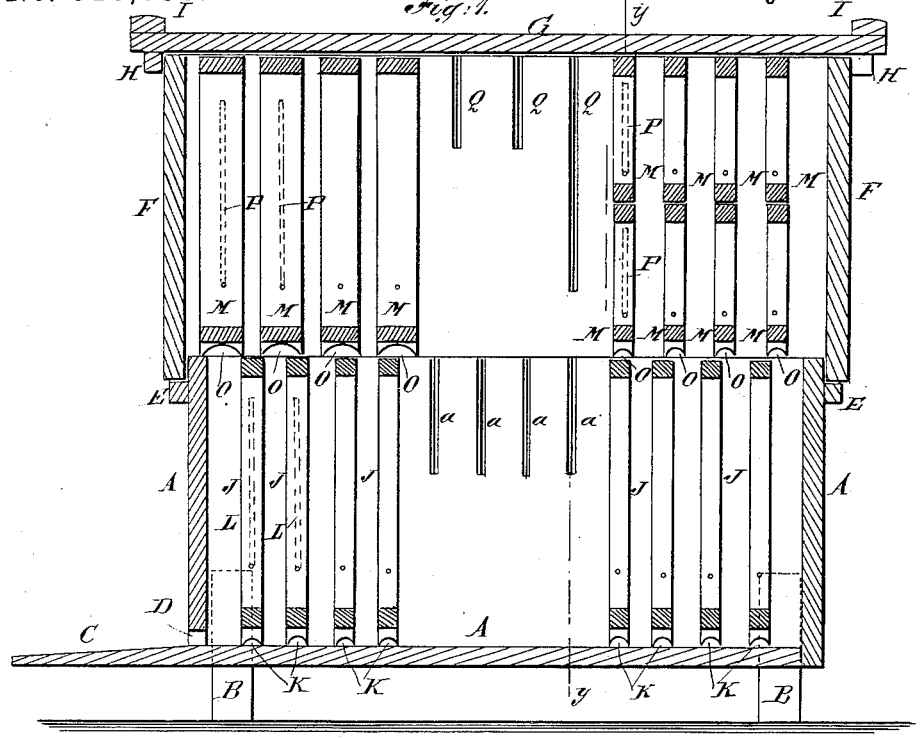
Figure 2:
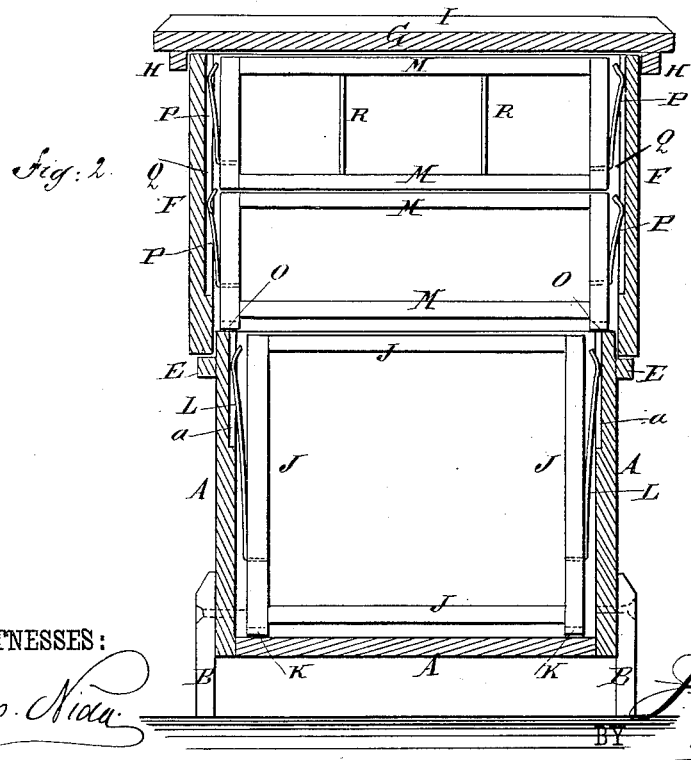

Figure 1, Sheet 1, is a sectional side elevation of one of my improved bee-hives, taken through the line $x\,x$, Fig. 3. Fig. 2, Sheet 1, is a sectional front elevation of the same, taken through the line $y\,y$, Fig. 1. Fig. 3, Sheet 2, is a plan view of the lower part of the hive. Fig. 4, Sheet 2, is a front elevation of the hive.

The object of this invention is to provide bee-hives constructed in such a manner that the bees can be more conveniently managed than they can be in hives constructed in the ordinary manner.

The invention relates to a bee-hive constructed with vertical grooves in its sides to receive springs attached to the side bars of the comb-frames, whereby the said comb-frames are centered and kept in place. The lower ends of the side bars of the comb-frames project below the bottom bars, and have recesses formed in them, whereby the bees can readily pass back and forth between the spaces below and at the sides of the frames. The surplus comb-frames are made with vertical bars dividing the said frames into sections, whereby surplus honeycombs can be had of any desired size, as will be hereinafter fully described.

A represents the lower part or brood-chamber of a bee-hive, which is supported upon short legs B, attached to its sides to raise its bottom out of contact with the bench, table, or other support for the hive. The bottom of the hive projects in front to form a platform, C, for the bees to take flight from and to alight upon. In the lower edge of the front of the hive is formed an opening, D, to serve as a passage-way for the bees from and to the interior of the hive.

To the outer surface of the sides and ends of the brood-chamber A, at a little distance from their upper edges, are attached cleats E, to form shoulders for the lower edges of the sides and ends of the surplus-honey chamber F to rest upon, as shown in Figs. 1 and 2. The surplus-honey chamber F is provided with a cover, G, which has cleats H attached to its lower side, to rest against the sides and one end of the top of the said chamber F, and thus center the said cover in position. To the ends of the upper side of the cover G are attached cleats I, to hold the said cover from warping.

J are the brood-chamber comb-frames, the side bars of which project three-eighths of an inch (more or less) below the bottom bars of the said frames to rest upon the bottom of the brood-chamber A, so that the bees can pass freely beneath the said bottom bars. The downwardly-projecting lower ends of the side bars of the frames J have recesses K formed in them in the plane of the said frames, to form spaces through which the bees can pass to and from the spaces between the side bars of the frames J and the sides of the chamber A from and to the spaces beneath the bottom bars of the said frames.

To the lower parts of the side bars of the comb-frames J are attached the lower ends of springs L, which incline from the said side bars, so that their upper parts will rest in vertical grooves $a$ in the inner surfaces of the sides of the chamber A, to center the said comb-frames and hold them securely in place with their side bars equally distant from the sides of the brood-chamber A. The upper ends of the springs L are bent inward slightly, to prevent them from catching upon the sides of the chamber A, and preventing the frames J from being withdrawn.

M are the surplus comb-frames, the lower ends of the side bars of which project below the bottom bars, rest upon the upper edges of the sides of the brood-chamber A, and have recesses O formed in them for the passage of the bees. The comb-frames M are provided with side springs, P, working in grooves Q in the sides of the surplus-honey chamber F in the same manner as the comb-frames J.

The surplus comb-frames M may be of the same height as the chamber F, as shown in the left-hand upper part of Fig. 1; or the frames M may be made in two parts, placed one upon the other, as shown in Fig. 2, and in the right-hand upper part of Fig. 1.

The surplus-honey frames M can be divided into sections by vertical bars R, as shown in Fig. 2, so that surplus honey-combs can be had of any desired size, and any desired amount of honey can be removed without its being necessary to cut any of the honey-cells.

Having thus described my invention, what I claim as new, and desire to secure by Letters Patent, is—

In a bee-hive, the comb-frames made, substantially as herein shown and described, with their side bars projecting below their bottom bars, and with recesses in the said projecting ends, whereby the bees can readily pass back and forth between the spaces below and at the sides of the frames, as set forth.

JOHN WILLIAM MARTIN.

Witnesses:
BENJ. F. CURTIS,
T. J. QUISENBERRY.